(12) United States Patent
Blöchlinger

(10) Patent No.: US 8,028,723 B2
(45) Date of Patent: Oct. 4, 2011

(54) METHOD AND DEVICE TO FILL RECEIVING CONTAINERS

(75) Inventor: Marc Blöchlinger, Uetikon am See (CH)

(73) Assignee: Mettler-Toledo AG, Greifensee (CH)

( * ) Notice: Subject to any disclaimer, the term of this patent is extended or adjusted under 35 U.S.C. 154(b) by 346 days.

(21) Appl. No.: 12/467,581

(22) Filed: May 18, 2009

(65) Prior Publication Data
US 2009/0293986 A1    Dec. 3, 2009

(30) Foreign Application Priority Data
May 22, 2008    (EP) .................................... 08156708

(51) Int. Cl.
B65B 31/00    (2006.01)
B67C 3/00    (2006.01)
(52) U.S. Cl. .................. 141/5; 141/83; 141/94; 141/98; 141/255; 222/77
(58) Field of Classification Search .............. 141/5, 83, 141/94, 98, 255; 222/77
See application file for complete search history.

(56) References Cited

U.S. PATENT DOCUMENTS

| 5,006,995 | A | * | 4/1991 | Toschi et al. | 700/240 |
| 5,423,216 | A | * | 6/1995 | Kitamura et al. | 73/433 |
| 6,380,495 | B1 | * | 4/2002 | Ash et al. | 177/116 |
| 2001/0027823 | A1 | | 10/2001 | Luchinger | |

FOREIGN PATENT DOCUMENTS

| EP | 1752744 A2 | 2/2007 |
| FR | 2663008 A1 | 12/1991 |
| JP | 58-72013 A | 4/1983 |

\* cited by examiner

*Primary Examiner* — Dinh Nguyen
(74) *Attorney, Agent, or Firm* — Standley Law Group LLP

(57) ABSTRACT

A receiving container is filled with a predetermined target mass $m_z$ of a free-flowing substance from a reservoir with the help of a dosage-dispensing device that dispenses measured doses of the substance. The device has a valve for variably setting the mass flow $\dot{m}$ from the reservoir into the receiving container. The device is also able to determine the time t that has elapsed since the beginning of the fill cycle, the mass m of the substance present in the receiving container, and a unit for controlling the valve. The controller unit includes estimating and correction modules. At least once during the fill cycle, the estimating module performs an estimate of the mass $\tilde{m}(t, t_2)$ that is expected to be present in the receiving container at the end of the fill cycle at the time $t_2$. This estimate is based on the assumptions that from the time t onward the valve is being closed according to a predefined closing-down profile and the fill cycle is completed at the time $t_2$. The correction module compares the mass $\tilde{m}(t, t_2)$ estimated at the time t to the target mass $m_z$. If the estimated mass $\tilde{m}(t, t_2)$ is smaller than the target mass $m_z$, the valve is controlled so that the aperture associated with the mass flow $\dot{m}$ that exists at the time t will be maintained longer by a differential time segment $\Delta t$, and/or the mass flow $\dot{m}$ at the time t is increased.

22 Claims, 6 Drawing Sheets

METHOD AND DEVICE TO FILL RECEIVING CONTAINERS

CROSS-REFERENCE TO RELATED APPLICATIONS

This application claims a right of priority under 35 USC §119 from European patent application 08 15 6708.3, filed 22 May 2008, the content of which is incorporated by reference as if fully recited herein.

TECHNICAL FIELD

The present invention concerns a method and a device to fill receiving containers, also referred to herein as target containers, with a predetermined target quantity of a free-flowing substance from a reservoir.

BACKGROUND OF THE ART

Filling devices of this kind are used in particular to dispense small dosage quantities which are needed for example in the pharmaceutical field. The receiving containers are often placed on a balance in order to weigh the mass of the substance delivered out of the dosage-dispensing device, so that the substance can subsequently be further processed in accordance with given specifications.

The substance of which a measured dose is to be dispensed is held for example in a source container or reservoir which is equipped with a dosage-dispensing head. The aim is now to deliver the dosage substance through an aperture of the dosage-dispensing device in such a way that at the end of the filling process a predetermined target mass of the substance is present in the receiving container. The important point is that the mass that is actually present in the receiving container should match the predetermined target mass as accurately as possible and that the target mass is exactly defined. It is further important that the filling process can be performed in the shortest time possible.

The known state of the art offers dosage-dispensing methods that are based on a volumetric measurement of the dispensed substance. For a substance of density $\rho$, a variable aperture cross-section A of the valve and a resultant delivery flow velocity u of the substance, one obtains the mass $m_z$ of the substance in the receiving container as:

$$m_z = \int_{t_{auf}}^{t_{zu}} \dot{m}(t)\,dt$$

$$= \int_{t_{auf}}^{t_{zu}} \rho \dot{V}(t)\,dt$$

$$= \int_{t_{auf}}^{t_{zu}} \rho (Au)(t)\,dt$$

$$= \int_{t_{auf}}^{t_{zu}} \rho A(t) u(A, h, d, \ldots)\,dt$$

The delivery flow velocity u in particular is subject to many influence factors such as for example the aperture area A of the valve, the static pressure resulting from the fill level height h of the substance in the reservoir, and the rheological properties of the substance such as for example the powder grain size d. The rheological properties in particular are often very complex and subject to influence factors that are known only with limited accuracy. For example, the delayed flow which occurs in a Bingham substance at the beginning of the flow process is difficult to take into account. Particularly in the dosage-filling of pulverous substances, factors such as grain size, moisture content and surface properties of the individual grains are of major importance.

A method of optimizing the accuracy of the target mass delivered from a reservoir into a receiving container during a dosage-filling process is disclosed in U.S. Pat. No. 6,380,495 B1. In the method according to this reference, a valve which is arranged between the reservoir and the receiving container is first held open for a certain time period at its maximum aperture and then abruptly closed. During the fill process, the weight of the substance in the receiving container is monitored with a balance. Inaccuracies occur in this case because a certain amount of time is needed for the closing of the valve and also because there is material in free fall between the valve and the receiving container during the filling process. As a result, the amount of mass indicated by the balance at the time of the abrupt closing of the valve is less than the final amount of mass which is present in the receiving container after the end of the filling process. This error is determined through a recursive method of least squares and corrected in a subsequent iteration of the fill cycle. A problem which presents itself here is the abrupt closing of the valve. During the abrupt closing, the substance being dispensed is exposed to additional forces. Especially when sensitive substances are being dispensed, such as for example fine chemicals or pharmaceutical substances, it is important that the substance is handled as gently as possible and exposed to as little stress as possible. Otherwise, there could be an undesirable change in the substance properties, i.e. the substance could get damaged. The abrupt closing could also lead to a compaction of the material. This compaction can change the material properties and thus the flow properties of the material, which would negatively affect the reproducibility of the filling process. A further problem lies in the fact that in the first fill cycle, there are no data available from preceding fill cycles. Accordingly, it is impossible to perform a correction for the first fill cycle, which may cause an error in the resultant fill quantity.

It is therefore an object to provide a method and a device to fill receiving containers with a predetermined target quantity of a free-flowing substance from a reservoir in a way that causes the least possible amount of stress on the substance to be delivered and provides the best possible accuracy.

SUMMARY

This objective is met by a method and a device with the features presented in the independent patent claims. Further advantageous embodiments can be found in the dependent claims.

The method and the device disclosed herein perform the function of filling a receiving container with a predetermined target mass $m_z$ of a free-flowing substance from a reservoir with the help of a dosage-dispensing device which serves to fill a measured dose of the substance into the receiving container. The dosage-dispensing device is equipped with a valve which allows a variable setting of the mass flow $\dot{m}$ from the reservoir into the receiving container. The dosage-dispensing device further includes a timing capability to determine the time t that has elapsed since the beginning of the fill cycle, a balance to determine the mass m of the substance that is present in the receiving container, and a controller unit with a valve control module for the control of the valve. The controller unit further includes an estimating module and a correction module, wherein at least at one time t during the fill cycle, the estimating module performs an estimate of the mass $\hat{m}(t, t_2)$ that is expected to be present in the receiving container at the end of the fill cycle at the time $t_2$, wherein the estimate is based on the assumptions that from the time t the valve is being closed in accordance with a predefined closing-down profile and the fill cycle is completed at the time $t_2$, and the correction module compares the mass $\hat{m}(t, t_2)$ estimated at the time t to the target mass $m_z$, and if the estimated mass $\hat{m}(t, t_2)$ is smaller than the target mass $m_z$, the valve is controlled in such a way that the aperture associated with the mass flow $\dot{m}$ that exists at the time t will be maintained longer by a differential time segment $\Delta t$, and/or the mass flow $\dot{m}$ at the time t is increased.

It is of advantage in this arrangement that different influence factors are compensated by the correction module. Possible influence factors are for example the delay in the start-up of the flow process, specific rheological properties of the substance, the fill level of the material in the reservoir, geometric properties of the valve, or material properties such as grain size.

The disclosed method and device further prove to be advantageous in dispensing doses of toxic substances, as it offers the possibility to automate the dispensing process. This reduces the risk that the person attending to the process could come into contact with the toxic substance.

The term "closing-down profile" in this context refers to a decrease of the mass flow $\dot{m}$ from an arbitrarily chosen time t during the fill cycle to the end of the fill cycle at the time $t_2$. At the time $t_2$ at the end of the fill cycle the valve is closed far enough that no further amount of mass m can flow out of the valve, while the valve has not been closed in an abrupt manner. The profile of the mass flow $\dot{m}$ during the closing-down process can be of an arbitrary shape. However, for simplicity, it is in most cases assumed that the mass flow $\dot{m}$ decreases linearly during the closing-down of the valve.

With special preference, the variable setting of the mass flow $\dot{m}$ can be realized by means of a variable aperture cross-section A of the valve.

In particular, the variable setting of the mass flow $\dot{m}$ can be realized by means of a conveyor screw with a variable rate of rotation.

In an ideal way, the variable setting of the mass flow $\dot{m}$ can be realized by means of a rotary stirrer mechanism with a variable rate of rotation.

In the present context, the process of opening the valve is understood with the meaning of a continuous increase of the mass flow $\dot{m}$. This increase of the mass flow $\dot{m}$ can be achieved for example by enlarging the aperture cross-section A of the valve, increasing the rate of rotation of the conveyor screw, and/or increasing the rate of rotation of the rotary stirrer mechanism.

The estimating module preferably uses data from the preceding fill cycles. Relevant data can include for example information regarding the required time $t_2$ to complete the fill cycle, the time integral $$\int_{t_1}^{t_2} A(t)\,dt$$

of the aperture cross-section or the actual weight $m(t_2)$ which is present in the receiving container at the end of the dosage-dispensing process. A particularly important factor is the mathematical expression $$f_a = \frac{m(t_2)}{\int_{t_1}^{t_2} A(t)\,dt}$$

which is referred to as the weight equivalent and is composed of the time integral of the aperture cross-section and the actual weight $m(t_2)$ which is present in the receiving container at the end of the dosage-dispensing process, because this expression implicitly represents the flow properties such as the delayed flow at the beginning of the fill cycle and the decrease in the static pressure with decreasing fill level h of the substance contained in the reservoir. Thus, for example the geometry of the valve, the density $\rho$ of the substance and the delay in the flow of the substance have a significant influence on the weight equivalent $f_a$. For example in the case of pulverous substances, the grain size, the grain size distribution, the shape of the grains and the surface properties of the grains enter into the weight equivalent $f_a$. The position of the individual grains at the time the valve is opened up can also have an influence on the weight equivalent $f_a$. For these reasons, the weight equivalent $f_a$ is preferably used in estimating the weight $m(t_2)$. The values of these flow parameters which were obtained in preceding fill cycles can be stored in a memory module, in particular an RFID tag (radio-frequency-based identifying device), and used in subsequent fill cycles. It is particularly advantageous to attach the RFID tag to the reservoir as this ensures that the substance in the reservoir is directly tied to the data stored in the RFID tag.

In a first fill cycle, no data are available yet from preceding fill cycles. To avoid exceeding the desired target mass $m_z$, it is therefore necessary to perform the first fill cycle slowly. After the first fill cycle, there are data available on which to base estimates for the subsequent fill cycles.

It is particularly advantageous if in a fill cycle the valve is opened exactly once and closed exactly once. Especially in the dispensing of sensitive substances, this point is of central importance because in this way the dispensed substance, for example a substance of the kind used in the pharmaceutical field or in the production of fine chemicals, is exposed to the least amount of stress possible. If the valve were opened and closed several times, the substance and in particular the grains of a powder to be dispensed would be exposed to shear forces which could lead to an undesirable change of the physical properties and could thus cause damage to the substance.

Also, a smooth, continuous opening and closing movement of the valve contributes to the gentle handling of the substance. A continuous opening movement in this context is understood to mean a continuous widening of the aperture cross-section of a valve, i.e.

$A(t) \leq A(t^*)$ for any values of $t \leq t^*$.

Analogously, in the closing of the valve the aperture cross-section of the valve is made continuously smaller, i.e.

$A(t) \geq A(t^*)$ for any values of $t \leq t^*$.

In order to simplify the opening and closing process, the valve is opened and closed in a stepwise movement.

It is advantageous to make the first use of the estimating module during a fill process at the point when the balance measures an amount of mass m for the substance in the target container which is at least equal to one-third of the target mass $m_z$. In this way, the valve can be opened up at a relatively fast rate in a preset manner without a correction, and the first portion of the target mass $m_z$ can be filled relatively quickly. Towards the end of the filling process it is more advantageous to fill the substance into the receiving container in a slow and controlled manner in order to ensure that the amount of substance that is present in the receiving container at the end of the filling process matches the target mass amount $m_z$ as accurately as possible. For this reason, it is also advantageous if the correction made with the help of the correction module is performed only in the phase of filling the last two thirds of the target mass $m_z$, and/or if the correction module is used only in the phase of closing of the valve.

Using the correction module repeatedly has a positive effect, because this allows differences between the estimated mass and the mass that is actually present in the receiving container to be adjusted on repeated occasions. Especially towards the end of the fill process, when the mass flow is already relatively low, the correction module should be applied repeatedly. This allows the targeted mass amount $m_z$ to be approached very accurately and ensures that there is no excess amount of mass delivered into the receiving container. The risk of overshooting the target mass $m_z$ is thereby avoided.

The method taught herein finds application in particular in the filling of pulverous or liquid substance doses. The liquid substances normally have complex rheological properties and are in many cases of a non-newtonian nature. The target mass that is of interest is typically in a range between 0.5 mg and 5000 mg. However, it is also possible to dispense doses of smaller or larger mass with this method.

In an advantageous embodiment, the valve has an outlet opening with a circular aperture cross-section and a closure element, wherein the outlet opening and the closure element are arranged on a common axis, the closure element is rotatable relative to the housing about the common axis and capable of a translatory movement along the common axis into and out of the outlet opening, and wherein the closure element has a cylindrical closure portion and a delivery portion, so that through the translatory movement of the closure element the valve can be opened and closed.

With the foregoing arrangement, it is advantageous to open and close the valve through a stepwise translatory movement of the closure element.

It is of advantage if the delivery portion of the closure element has a variable aperture cross-section A. In this way, the magnitude of the mass flow $\dot{m}$ moving through the valve is directly correlated with the position of the closure element of the valve. Ideally, the translatory position L in the lengthwise direction of the closure element correlates directly to the aperture cross-section of the valve, i.e. $A=A(L)$. Depending on the configuration of the valve, there can be a direct proportional relationship between the translatory position of the closure element L, the aperture cross-section A and the mass flow $\dot{m}$:

$$\Delta L \propto \Delta A \propto \dot{m}.$$

However, this kind of direct proportionality cannot normally be achieved in real situations, because the material properties such as for example grain size, delay in the start-up of the flow process or similar factors also work against a direct proportionality. Still, it can be taken as a rule that a larger opening cross-section is associated with a larger mass flow.

Ideally, to open and close the valve, the closure element moves in translatory steps $\Delta L$ of equal magnitude. Thus, the opening and closing phase run along the same time profile of the aperture cross-section A, whereby errors occurring in the opening phase of the valve are compensated by errors occurring in the closing phase of the valve. For example, if the substance—due to powder grain size and/or valve geometry—does not begin to flow until a translatory position $L_1$ of the closure element has been passed, it can be assumed that in the closing phase there will be no more material delivered out of the valve after the translatory position $L_1$ has been passed again.

It is advantageous to use a closure element which can be rotated with a variable rotary speed $\omega$, wherein the speed of rotation $\omega$ correlates directly with the mass flow $\dot{m}$ that passes through the valve.

It is further of advantage if the valve is equipped with a tapping mechanism, wherein taps are directed at the already opened valve with a variable tapping frequency F. In such an arrangement, the tapping frequency F correlates directly with the mass flow $\dot{m}$ through the valve, and an increase in the tapping frequency leads to an increased mass flow $\dot{m}$. The tapping can be in the direction of the axis as well as perpendicular to the axis of the closure element.

Furthermore, the taps can be directed at the closure element of the valve and/or at the housing of the valve.

The rotary movement as well as the tapping has the beneficial effect that a clogging of the valve and/or the formation of powder bridges can thereby be counteracted. In this way, the ability of the powder to low freely can be preserved or enhanced.

The controller unit can be realized in part or in its entirety as a computer-based system.

BRIEF DESCRIPTION OF THE DRAWINGS

The method and the device for the filling of receiving containers are described hereinafter through examples that are schematically illustrated in the attached drawings, wherein identical parts are identified by identical reference numbers and wherein.

DETAILED DESCRIPTION OF THE EMBODIMENTS

Figure 1:
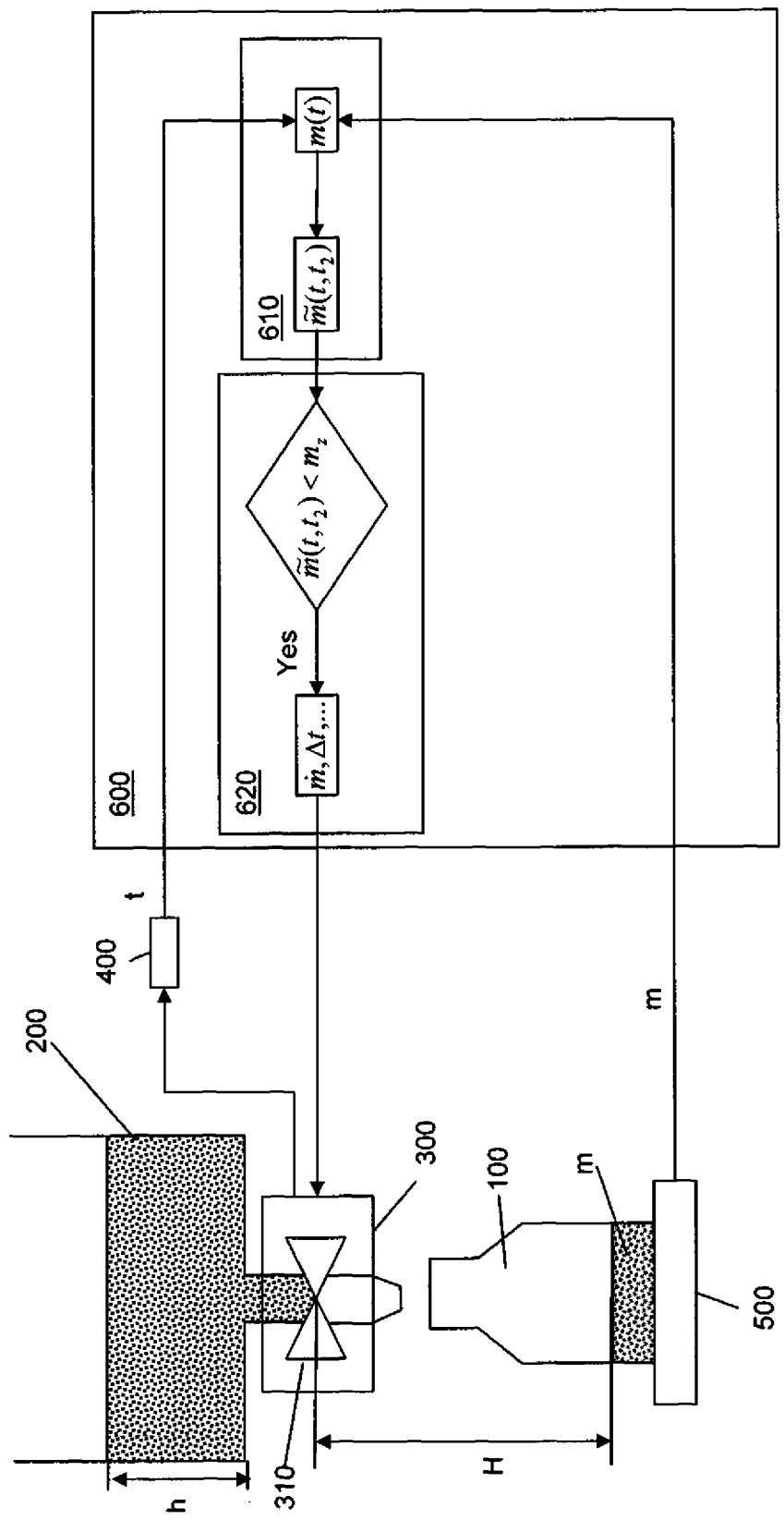
FIG. 1 schematically represents the device for the filling of receiving containers in an embodiment of the invention.

FIG. 1 illustrates a receiving container 100 which can be filled by way of a dosage-dispensing device 300 with a substance held in the reservoir 200 up to the fill level h. The dosage-dispensing device 300 is tied to a timing device 400 whereby the elapsed time from the start of the fill cycle can be determined and the signal representing the measured time can be transmitted to a controller unit 600. The receiving container is arranged on a balance 500, so that the weight of the substance that is present in the receiving container 100 can be determined. The signal representing the measured weight or mass can likewise be transmitted to the controller unit 600. In the controller unit 600, the time signal and the mass signal are tied to each other, so that the result represents the mass m(t) which is present at a certain elapsed time t from the start of the dosage-dispensing cycle.

Ideally, the valve 310 would be opened up more and more until the receiving container 100 holds one-half of the desired target mass $m_z$. Again in an ideal case, the valve 310 would subsequently be closed down again, while the second half of the desired target mass is being delivered into the receiving container 100. In this process, the valve 310 should be opened and closed as fast and as wide as possible in order to take the shortest possible time for the fill cycle. The problem with this is that the mass m(t) which is in the receiving container 100 at the time t is unknown, because the weighing signal produced by the balance 500 is delayed due to several factors. For example, the mass that is in free fall in the height interval H between the valve 310 and the receiving container 100, more specifically the surface level of the substance in the receiving container 100, is not registered by the balance 500. Furthermore, the balance needs a certain amount of time in order to produce a stable weighing result. These inaccuracies make it necessary to estimate the mass m(t) that is in the receiving container 100 at the time t by means of an estimating module 610 which is included in the controller unit 600 and, based on the data obtained from the estimating module 610, to apply a correction to the control of the valve by means of a correction module 620 which is likewise included in the controller unit 600.

From the estimating module 610, an estimate of the mass $\tilde{m}(t, t_2)$ that is predicted to be in the receiving container 100 at the time $t_2$ at the end of the fill cycle is obtained at least at one time t during the fill cycle, wherein the estimate is based on the assumption that from the time t onward the valve 310 is being closed according to an assumed closing-down profile. The correction module 620 compares the mass $\tilde{m}(t, t_2)$ that was estimated for the time t to the target mass $m_z$, and if the current mass estimate $\tilde{m}(t, t_2)$ for the end of end of the fill cycle is smaller than the target mass $m_z$, the valve (310) is controlled in such a way that the aperture associated with the mass flow $\dot{m}$ that exists at the time t will be maintained longer by a differential time segment $\Delta t$, and/or the mass flow $\dot{m}$ at the time t will be increased. This increase of the mass flow $\dot{m}$ can be achieved for example by enlarging the aperture cross-section A of the valve, increasing the rate of rotation of the conveyor screw, increasing the rate of rotation ω, and/or increasing the tapping frequency F.

To determine the mass $\tilde{m}(t, t_2)$ that is estimated to be in the receiving container 100 at the end of the fill cycle, it is necessary to know the mass which is present in the receiving container 100 at the time t. One could use for this purpose the mass m(t) measured by the balance 500. However, especially in the filling of small amounts of mass, a delay in the weighing signal leads to intolerable inaccuracies. For this reason, the mass m(t) measured by the balance 500, especially at the beginning of the fill cycle, cannot be relied on. Instead, an estimated mass $\tilde{m}(t)$ is used. It is possible to base the estimate of the mass on the integral of the already completed part of time profile of the valve aperture $$\int_{t_1}^{t} A(\tau) d\tau,$$

wherein the latter is weighted with a correction facture $f_a$:

$$\tilde{m}(t) = f_a \cdot \int_{t_1}^{t} A(\tau) d\tau.$$

The factor $f_a$ is also referred to as weight equivalent and either has to be estimated or is determined with the help of data from preceding fill cycles. It is possible to determine $f_a$ as follows:

$$f_a = \frac{m(t_2)}{\int_{t_1}^{t_2} A(t) dt}$$

Among the properties that enter indirectly into the weight equivalent are the density of the powder, the grain size and the geometry of the valve 310. Ideally, the weight equivalent is determined anew after each dosage cycle, stored in memory and used for the next dosage cycle. This increases the accuracy of $f_a$ with each dosage cycle.

The estimate of the mass that is present in the receiving container is a point of central importance particularly at the beginning of the dosage cycle, primarily because of the delayed output of the weighing signal. The further the dosage cycle progresses, the higher will be the accuracy of the mass m(t) as measured by the balance. At an advanced stage of the fill process the mass m(t) measured by the balance 500 can therefore also enter into the determination of the mass $\tilde{m}(t)$. A possibility to determine the mass $\tilde{m}(t)$ is offered for example by the equation $$\tilde{m}(t) = f_b \cdot f_a \cdot \int_{t_1}^{t} A(\tau) d\tau + (1 - f_b) \cdot m(t) \qquad (1)$$

wherein $f_b$ is a weighting factor that is greater than zero and smaller than or equal to one. It is evident from this equation that for $f_b=0$ only the weighing signal is used to determine the mass $\tilde{m}(t, t_2)$, and for $f_b=1$ only the estimated value based on the time integral of the aperture area and on the weight equivalent is used to determine the mass $\tilde{m}(t)$. If $0<f_b<1$, the mass $\tilde{m}(t)$ is determined from the weighing signal and an estimate. A possibility to determine $f_b$ is based on the following criterion:

In a case where $\tilde{m}(t)<\frac{1}{2} m_z$, fb is determined as $$f_b = \frac{\tilde{m}(t)}{m_z}.$$

Otherwise, if $\tilde{m}(t)>\frac{1}{2} m_z$, fb is determined as $$f_b = \frac{m(t)}{m_z},$$

Else, if $\tilde{m}(t)=\frac{1}{2} m_z$, fb is determined as $f_b=\frac{1}{2}$.

This means that the farther the fill cycle progresses the more the weighing signal of the balance 500 is taken into account.

Based on the estimated mass $\tilde{m}(t)$, it is possible to make an estimate $\tilde{m}(t, t_2)$ of the mass that will be present in the receiving container at the end of the fill cycle. This estimate can be based for example on the time integral of the aperture area of the valve. The estimate $\tilde{m}(t, t_2)$ can now be obtained from $$\tilde{m}(t, t_2) = \tilde{m}(t) \cdot \frac{\int_{t_1}^{t} A(\tau)d\tau + \int_{t_1}^{t_2} A(\tau)d\tau}{\int_{t_1}^{t} A(\tau)d\tau}. \quad (2)$$

This estimate relies on the idealized assumption that the valve is being closed at the fastest speed possible. The ending time $t_2$ of the fill cycle can be established from the already elapsed time t and the time $\Delta t$ required to close the valve 310:

$$t_2 = t + \Delta t$$

With this estimate, one normally relies on the assumption that the valve 310 can be opened at the beginning of the fill cycle with exactly the same speed as it can be closed at the end of the fill cycle.

Should the calculated estimate $\tilde{m}(t, t_2)$ be smaller than the desired target mass $m_z$, the correction module 620 will be able to compensate for this difference by keeping the valve open longer and/or by increasing the mass flow $\dot{m}$ that passes through the valve.

In the further course of the fill cycle, this correction can be performed repeatedly. In this way the dispensed mass converges towards the desired target mass. This convergence towards the desired target mass $m_z$ represents a significant advantage of the method according to the invention. It provides in particular the possibility to compensate for factors affecting the accuracy such as can be caused for example by a change in the fill level h, the geometric properties of the valve or a delayed start of the flow. Changes in the flow properties that occur over time can likewise be compensated in this manner. For example, in the first fill cycle the fill level h is higher than in subsequent fill cycles, which has the consequence of a higher static pressure and thus a higher discharge speed in the first fill cycle.

Figure 2:
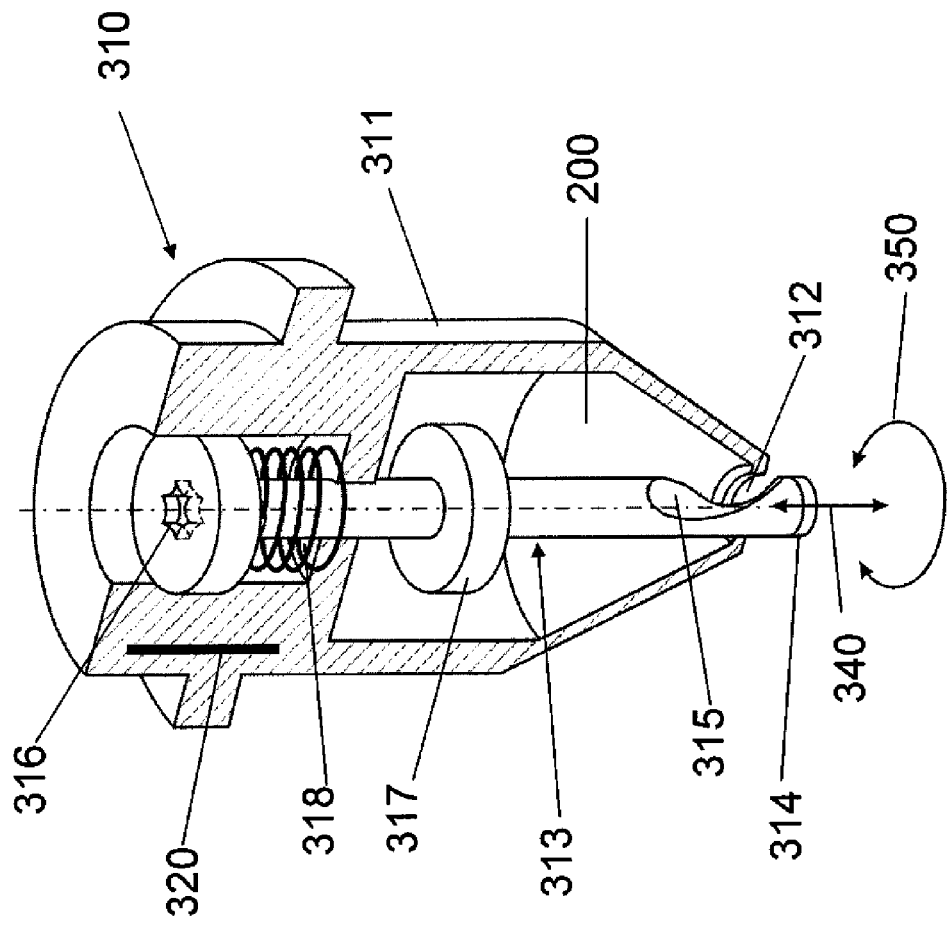
FIG. 2 illustrates a valve with a valve housing and a closure element.

FIG. 2 shows a valve 310 with a housing 311 and an outlet opening 312 which has a circular cross-section. Arranged in the valve 310 is a closure element 313. The closure element 313 has a cylindrical closure portion 314 and a delivery portion 315. The outlet opening 312 and the closure element 313 are arranged on a common axis, and the closure element 313 is capable of a rotary movement 350 about the common axis as well as a translatory movement 340 along the common axis. This allows the closure element 313 to be moved into and out of the outlet opening 312. The rotary movement 350 and the translatory movement 340 of the closure element 313 are generated by means of a drive mechanism which is coupled to the closure element 313 by way of a coupler element 316. Arranged between the valve housing 311 and the closure element 313 is a resetting element 318 which allows the closure element 313 to be reset to its home position. This resetting element 318 is preferably a closure spring. The resetting movement of the closure spring is delimited by a stop 317.

Between the closure element 313 and the valve housing 311 a hollow space is formed which serves as reservoir 200 for the substance to be dispensed. When the closure element 313 is moved in a translatory displacement 340, the substance that is to be dispensed can pass from the reservoir 200 by way of the delivery portion 315 of the closure element 313 through the outlet opening 312 out of the valve 310 into the receiving container 100.

The valve 310 is equipped with a memory module 320 which serves to store data. This memory module 320 allows for example the storage of material properties of the substance to be dispensed and/or flow parameters from preceding fill cycles. The memory module 320 is arranged on or enclosed in the valve housing 311.

Figure 3:
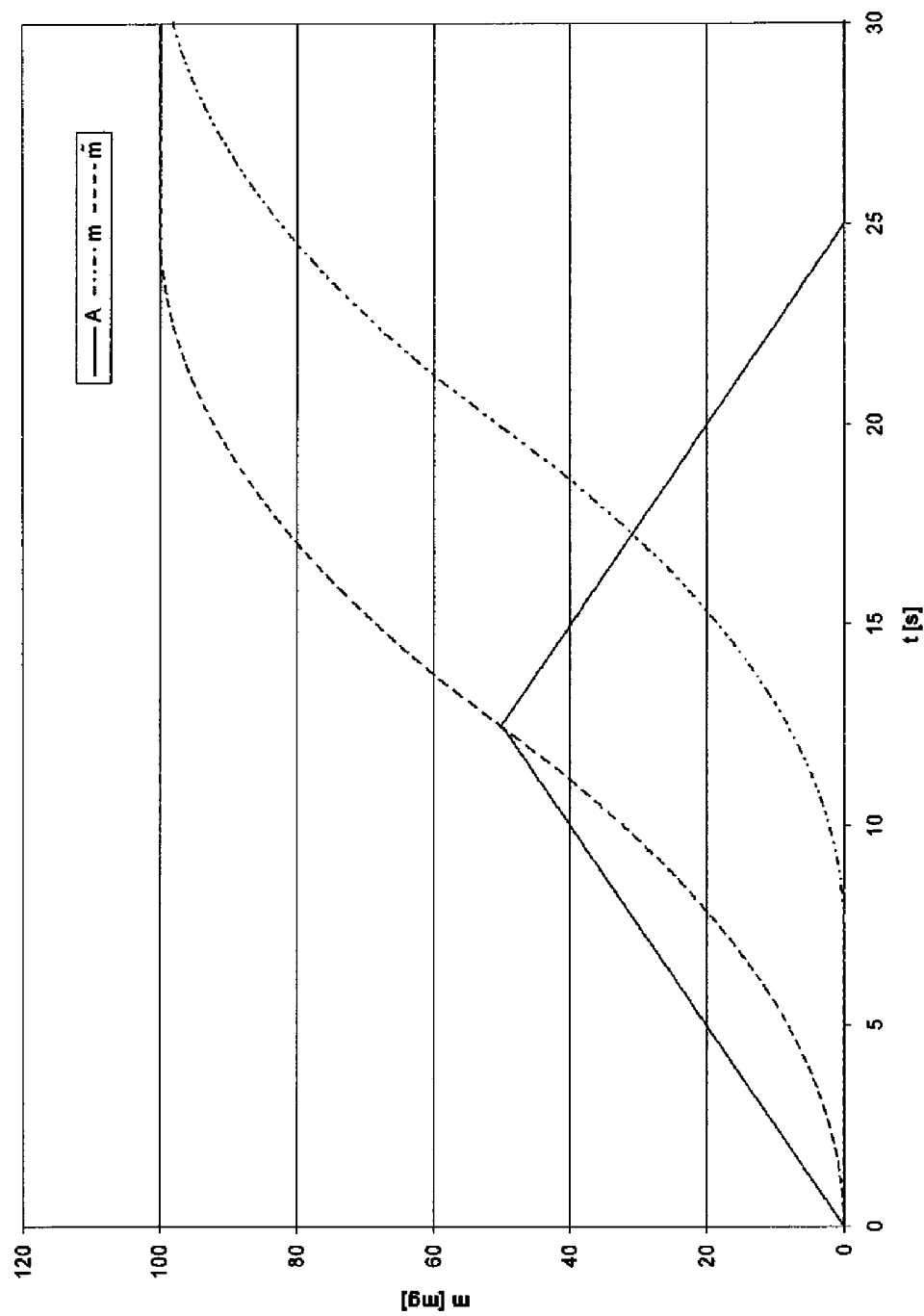
FIG. 3 shows graphs representing an idealized time profile of the fill cycle.

For an idealized fill cycle profile, FIG. 3 shows the respective time profile graphs of the aperture cross section A, the mass m as measured by the balance, and the estimated mass $\tilde{m}$. In this ideal case, the aperture cross section A is increased up to the point where exactly one-half of the desired target mass $m_z$ is present in the receiving container 100. Then the aperture cross section A is continuously decreased, with the second half of the desired target mass $m_z$ being delivered into the target container 100. This fill cycle is based on the assumption that the respective time profile graphs for the aperture cross-section A in the opening and closing phase are identical except for the reversal of direction. Thus, at the point where the valve 310 shuts off, the receiving container 100 holds exactly the desired target mass $m_z$. Due to a delay in the weighing signal, the balance is not yet indicating the target mass $m_z$. Therefore, an estimate $\tilde{m}$ has to be made for the mass that is actually present in the target container 100.

The inaccuracies which in reality occur in actual fill cycles and which are caused for example by the influence of the grain size or by the fill level in the reservoir are not taken into account in this idealized fill cycle.

Figure 4:
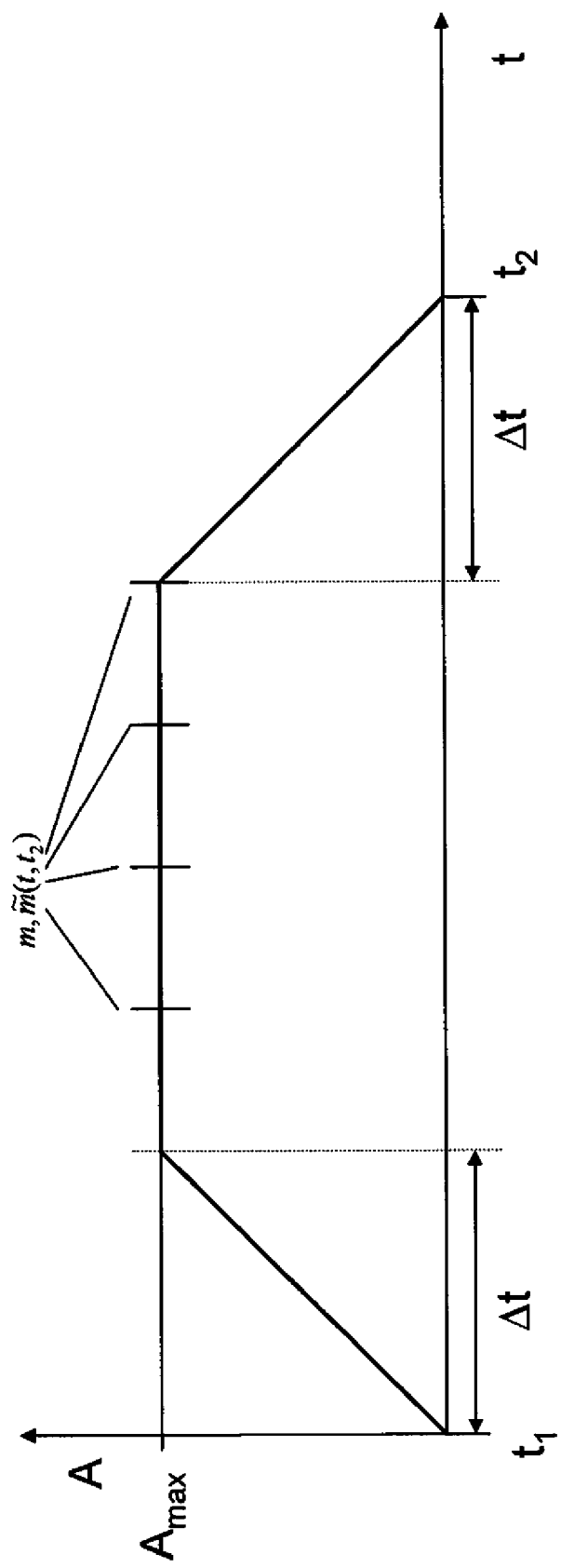
FIG. 4 shows a graph representing a further idealized time profile of the fill cycle, wherein the valve is opened up to its maximum aperture cross-section $A_{max}$.

FIG. 4 shows a graph with a further idealized time profile of a fill cycle in which the valve is opened up to its maximum aperture cross-section $A_{max}$. From the time $t_1$, the valve 310 is continuously opened up, i.e. the aperture cross-section $A_{max}$ is continuously increased. At the time $t_1 + \Delta t$ the maximum aperture cross-section $A_{max}$ is attained. Subsequently, the estimated amount $\tilde{m}(t)$ of the mass that is present in the receiving container 100 is at different times determined in accordance with equation (1). Based on $\tilde{m}(t)$, an estimate $\tilde{m}(t, t_2)$ is made with the help of equation (2) for the mass predicted to be present in the receiving container at the end of the fill cycle. If $\tilde{m}(t, t_2)$ is found to be within a tolerance interval for the target mass $m_z$, i.e. if $$m_z \leq \tilde{m}(t,t_2) - \epsilon, \epsilon > 0,$$

the valve 310 is closed down. The closing-down of the valve 310 occurs through a linear decrease of the aperture cross-section A in the time interval from $t_2 - \Delta t$ to $t_2$.

In the illustrated fill cycle, the aperture cross-section A is increased and decreased according to a linear time profile. However, it is also conceivable to increase or decrease the aperture cross-section A in a different way. In particular, the increase and/or decrease can be performed in a stepwise manner.

Figure 5:
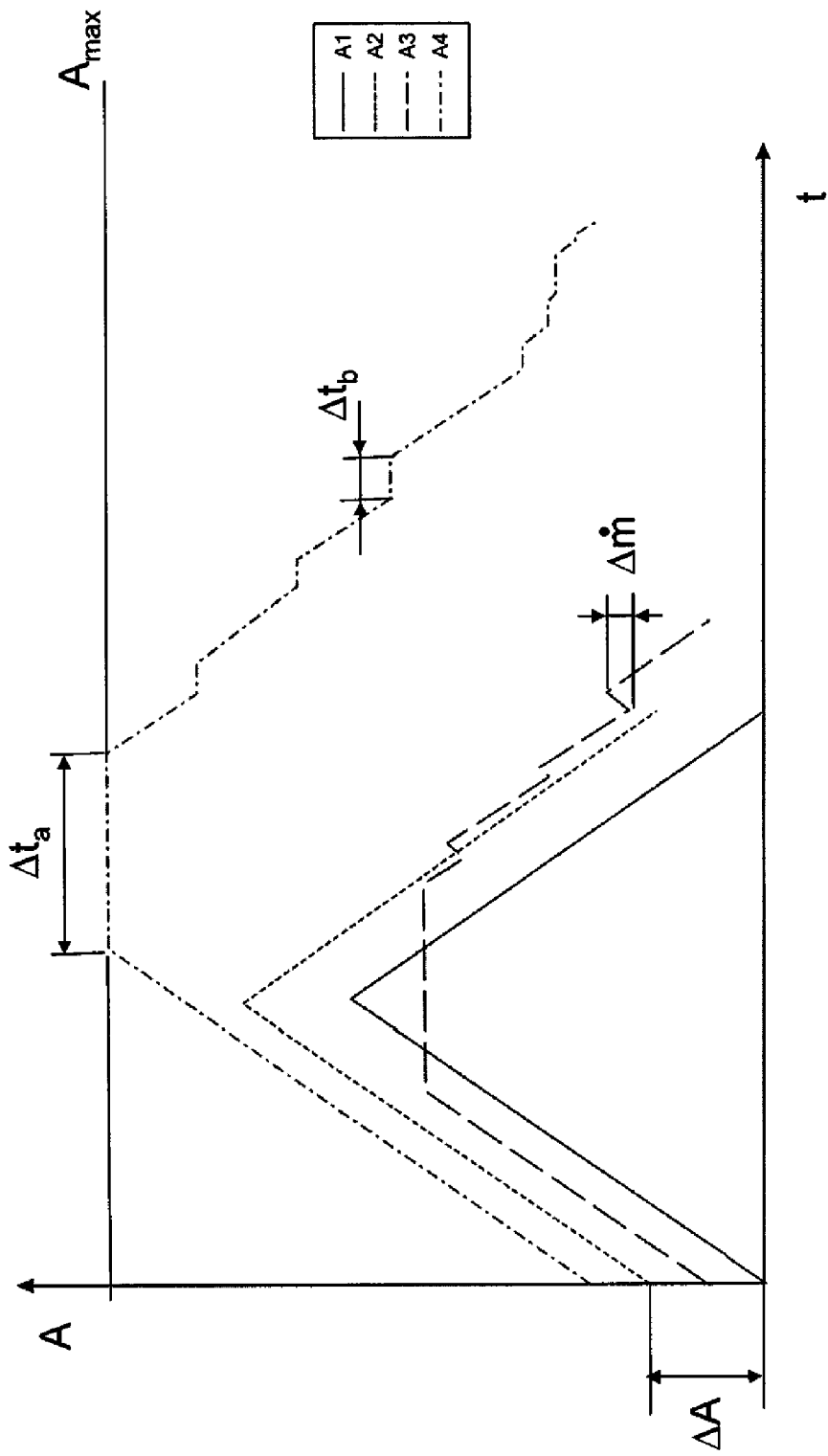
FIG. 5 shows graphs representing the time profile of the aperture cross-section for different idealized fill cycles according to the invention.

FIG. 5 shows time profile graphs of the aperture cross-section A for different idealized fill cycles according to the invention.

Graph A1 shows for comparison with the other fill cycles an idealized time profile of the aperture cross-section A in a fill cycle as shown already in FIG. 3.

Graph A2 likewise represents an idealized time profile of the aperture cross-section A in a fill cycle as shown already in FIG. 3, with the difference that the substance to be dispensed exhibits a delayed flow at the beginning of the fill cycle. The valve 310 therefore has to be opened up first by an amount $\Delta A$ of cross-sectional area of the aperture before substance can begin to flow. This delayed flow is caused for example by the grain size in pulverous substances or by other rheological properties. If the valve 310 of FIG. 2 is used, there is a direct correlation between the aperture cross-section A and the translatory displacement 340 of the closure element 313.

Graphs A3 and A4 likewise show a delayed flow.

Graph A3 shows the time profile of the cross-sectional area A of the aperture for a fill cycle according to the invention. In this fill cycle, the aperture cross-section A increased by opening up the valve 310 until a part of the desired target mass $m_z$ is present in the receiving container 100. Ideally this part is larger than one-third of the target mass $m_z$, and it must be smaller than one-half of the target mass $m_z$. If one-half of the target mass $m_z$ were already present in the receiving container 100 at the time of opening the valve 310, and with the assumption that the valve 310 cannot be closed faster than it is opened, this would mean that an overshooting of the target mass $m_z$ could no longer be corrected. In order to perform the dosage-dispensing process as rapidly as possible, it recommends itself to execute the opening-up phase of the valve 310 at the highest speed possible. The closing-down, however, should be performed more slowly because this facilitates a more accurate convergence towards the desired target mass $m_z$. In the closing down of the valve 310, the correction module 620 is applied repeatedly, with the correction being achieved in this case by increasing the aperture cross-section A and thereby increasing the mass flow $\dot{m}$ by an amount $\Delta\dot{m}$. At the time the valve 310 is shut off, the receiving container 100 will hold exactly the desired target mass $m_z$. The mass m that is present in the receiving container 100 can be determined from the weighing signal of the balance 500 with the help of equation (1) and/or an estimate.

Graph A4 shows the time profile of the aperture cross-section A for a further fill cycle according to the invention. In graph A4, the dosage quantity to be filled is larger than in the graphs A1, A2 or A3. The valve 310 therefore needs to be opened up to the maximum aperture cross-section $A_{max}$. This aperture of maximum cross-sectional area $A_{max}$ is maintained until a part of the desired target mass $m_z$ is present in the receiving container 100. Ideally, as in graph A2, this part is larger than one-third of the target mass $m_z$, and it must be smaller than one-half of the target mass $m_z$. In graph 4, this is achieved by maintaining the maximum aperture cross-section $A_{max}$ over a time interval $\Delta t_a$. Subsequently, the valve 310 is closed down again by decreasing the aperture cross-section A. In the closing-down of the valve, the correction module 620 is applied. The correction is in this case achieved by keeping the valve 310 open longer by a differential time interval $\Delta t_b$. The correction is performed in such a way that when the valve 310 is shut off, the receiving container 100 holds exactly the desired target mass $m_z$.

The mass flow for the fill cycles shown in FIGS. 3, 4 and 5 is achieved exclusively by varying the aperture cross-section A. However, there are other ways in which the mass flow $\dot{m}$ can be influenced. It is possible for example to control the mass flow $\dot{m}$ by tapping against the valve 310. The tapping frequency F in this case correlates with the mass flow $\dot{m}$. In addition, if a valve 310 according to FIG. 2 with a closure element 313 is being used, the mass flow $\dot{m}$ can also be controlled by varying the rate of rotation $\omega$ of the closure element 313.

Figure 6:
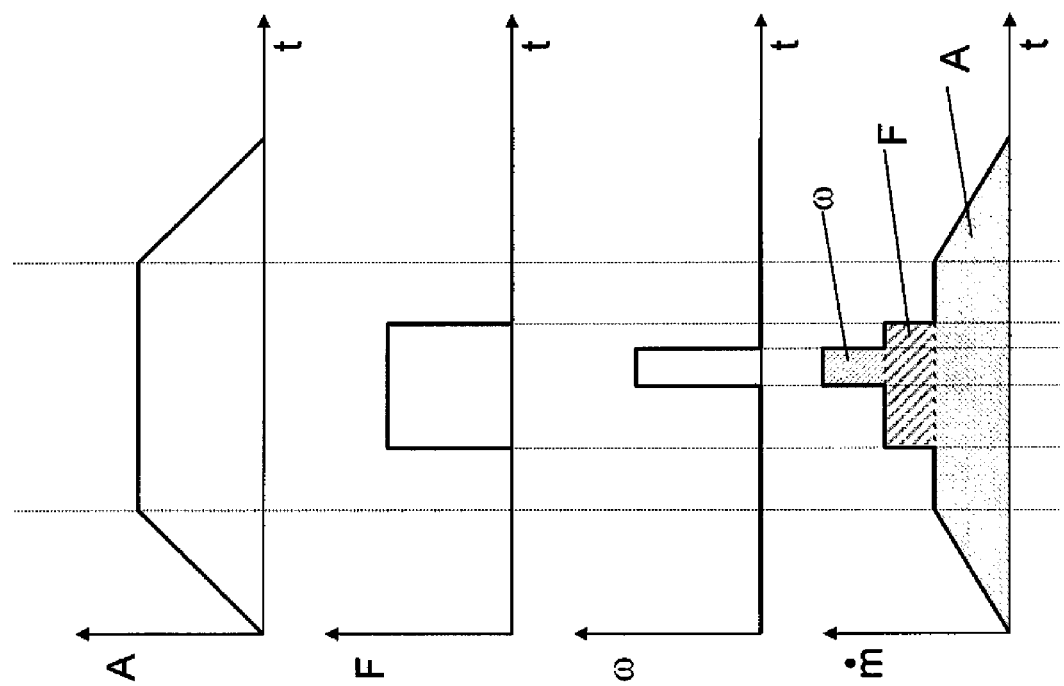
FIG. 6 shows graphs which illustrate, respectively, the influence which the aperture cross-section A, the tapping frequency F and the speed of rotation $\omega$ have on the mass flow $\dot{m}$.

The graphs shown in FIG. 6 illustrate the effects of, respectively, the variation of the aperture cross-section A, an abrupt surge of the tapping frequency F, and an abrupt surge of the rate of rotation $\omega$ during a fill cycle. The superposition of these parameters in an idealized situation leads to the illustrate time profile of the mass flow $\dot{m}$. The graphs make it evident that the aperture cross-section A as well as the tapping frequency F and the rate of rotation $\omega$ all have an influence on the time profile of the mass flow $\dot{m}$.

Although the invention has been described through a presentation of specific examples of embodiments, it is considered obvious that numerous further alternative embodiments can be created from a knowledge of the present invention, for example by combining features of the individual examples with each other and/or by interchanging individual functional units of the exemplary embodiments. For example, the correction through an increase in the mass flow which is shown in Graph A3 can be combined with the concept of keeping the valve open longer. It is further conceivable to use any other kinds of valves that allow a variable setting of the mass flow.

What is claimed is:

1. A method for filling a receiving container with a predetermined target mass of a free-flowing substance from a reservoir, comprising the steps of:
    providing an arrangement, comprising:
        a dosage-dispensing device, positioned between the reservoir and the receiving container, the dosage dispensing-device comprising a valve which allows a variable setting of the mass flow rate from the reservoir into the receiving container;
        a timing means,
        a balance, positioned beneath the receiving container; and
        a unit for controlling the valve, the controller unit comprising an estimating module and a correction module, the controller unit in communication with the timing means and the balance;
    setting a mass flow rate of the valve;
    beginning a fill cycle;
    determining, using the balance, the mass of the substance present in the receiving container, at an elapsed time t since the beginning of the fill cycle, as measured by the timing means;
    estimating, in the estimating module, the expected mass to be present in the receiving container at the end of the fill cycle at a time $t_2$, the estimate based on the assumptions that:
        from the time t to a future time $t_2$, the valve is being closed according to a predefined closing-down profile; and
        the fill cycle will be completed at time $t_2$; and
    comparing, in the correction module, the estimated expected mass to the target mass, and, if the estimated mass is found to be smaller than the target mass, controlling the valve to perform at least one of:
        maintaining the valve setting associated with the mass flow rate at time t for a differential time segment $\Delta t$, and
        increasing the mass flow rate existing at the time t.

2. The method of claim 1, wherein:
    the step of setting the valve mass flow rate is realized by a variable cross-section aperture of the valve.

3. The method of claim 1, wherein:
    the step of setting the valve mass flow rate is realized by a variable rate of rotation of a conveyor screw and/or a rotary stirrer mechanism of the valve.

4. The method of claim of claim 1, wherein
    the step of estimating the expected mass includes using data stored in a database from preceding fill cycles.

5. The method of claim 4, wherein:
    the data from preceding fill cycles comprise:
        the required time $t_2$ to complete the fill cycle;
        the time integral over the fill cycle of the valve aperture cross-section; and
        the actual weight present in the receiving container at the end of the fill cycle.

6. The method of claim 1, wherein:
    the valve is opened up exactly once and closed down exactly once during the process of filling the receiving container.

7. The method of claim 1, wherein:
the valve is opened up and/or closed down in a continuous movement.

8. The method of claim 1, wherein:
the valve is opened up and/or closed down in a stepwise movement.

9. The method of claim 1, wherein:
the step of estimating the expected mass is performed when the mass measured by the balance in the determining step is at least one-third of the target mass.

10. The method of claim 1, wherein:
the correction module is used in the closing-down of the valve.

11. The method of claim 1, wherein:
the correction module is used repeatedly during the fill cycle.

12. The method of claim 1, wherein:
the valve comprises:
a housing;
an outlet opening with a circular aperture cross-section; and
a closure element, comprising a cylindrical closure portion and a delivery portion, the closure element arranged on a common axis with the outlet opening, with the closure element rotatable relative to the housing about the common axis and slidable into and out of the outlet opening in a translatory movement along the common axis that opens and closes the valve.

13. The method of claim 12, wherein:
the valve is opened and/or closed through a stepwise translatory movement of the closure element.

14. The method of claim 13, wherein:
the valve is opened and/or closed by moving the closure element in translatory steps $\Delta L$ of equal magnitude.

15. The method of claim 12, wherein:
the delivery portion has a variable cross-section aperture; and
the translatory displacement L of the closure element correlates directly with the cross-section.

16. The method of claim 12, wherein:
the closure element rotates with a variable rotary speed that correlates directly with the mass flow rate through the valve.

17. The method of claim 12, wherein:
the valve further comprises a tapping mechanism, such that taps are directed at the already opened valve, the variable frequency of the taps correlating directly with the mass flow rate through the valve.

18. An arrangement for filling a receiving container with a predetermined target mass of a free-flowing substance from a reservoir, comprising:
a dosage-dispensing device, positioned between the reservoir and the receiving container, the dosage dispensing-device comprising a valve which allows a variable setting of the mass flow rate from the reservoir into the receiving container;
a means for timing the elapsed time of a fill cycle;
a balance, positioned beneath the receiving container to determine the mass of the substance that is present in the receiving container at an elapsed time t since the beginning of the fill cycle; and
a unit for controlling the valve, in communication with the timing means and the balance, the controller unit comprising:
a module for estimating, at least once during the fill cycle, the mass expected to be present in the receiving container at the end of the fill cycle at the time t2, the estimate being based on the assumptions that, from the time of the estimate, the valve is being closed in accordance with a predefined closing-down profile and that the fill cycle is completed at the time t2; and
a module for correcting at least one of: the mass flow rate and the closing time, the module adapted to compare the estimated expected mass from the estimating module to the target mass, and controlling the valve, if the estimated expected mass is smaller than the target mass, by at least one of:
maintaining the valve aperture setting at the mass flow rate at elapsed time t for a differential time segment $\Delta t$; and
increasing the mass flow rate through the valve.

19. The arrangement of claim 18, wherein:
the valve comprises:
a housing;
an outlet opening with a circular aperture cross-section; and
a closure element, comprising a cylindrical closure portion and a delivery portion, the closure element arranged on a common axis with the outlet opening, with the closure element rotatable relative to the housing about the common axis and slidable into and out of the outlet opening in a translatory movement along the common axis that opens and closes the valve.

20. The arrangement of claim 19, wherein:
the delivery portion has an aperture with a variable cross-section, the translatory displacement of the closure element being directly correlated with the aperture cross-section.

21. The arrangement of claim 19, wherein:
the closure element is rotated at a variable rotary speed that correlates directly with the mass flow rate through the valve.

22. The device of claim 19, wherein:
the valve further comprises a tapping mechanism that directs taps with a variable tapping frequency at the already-opened valve, the tapping frequency directly correlated to the mass flow rate through the valve.

* * * * *